(12) United States Patent
Sakaguchi

(10) Patent No.: US 9,927,043 B2
(45) Date of Patent: Mar. 27, 2018

(54) FLOW RATE CONTROL VALVE

(71) Applicant: MIKUNI CORPORATION, Tokyo (JP)

(72) Inventor: Masayoshi Sakaguchi, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 65 days.

(21) Appl. No.: 15/114,309

(22) PCT Filed: Jan. 27, 2015

(86) PCT No.: PCT/JP2015/052103
§ 371 (c)(1),
(2) Date: Jul. 26, 2016

(87) PCT Pub. No.: WO2015/111749
PCT Pub. Date: Jul. 30, 2015

(65) Prior Publication Data
US 2017/0002950 A1    Jan. 5, 2017

(30) Foreign Application Priority Data

Jan. 27, 2014   (JP) .................... 2014-011985

(51) Int. Cl.
*F16K 27/02* (2006.01)
*F16K 31/04* (2006.01)
(Continued)

(52) U.S. Cl.
CPC .......... *F16K 31/04* (2013.01); *F02M 23/006* (2013.01); *F16K 3/246* (2013.01); *Y02T 10/146* (2013.01)

(58) Field of Classification Search
CPC .......... F16K 27/02; F16K 31/043; F16K 1/12; F16K 31/04; F02D 31/005;
(Continued)

(56) References Cited

U.S. PATENT DOCUMENTS 5,971,007 A * 10/1999 Harcourt .................. F16K 3/36
                                                             137/246.22
6,220,571 B1 * 4/2001 Kim ....................... F16K 31/047
                                                             251/129.11
(Continued)

FOREIGN PATENT DOCUMENTS

| JP | 2003-139011 | 5/2003 |
| JP | 2006-524787 | 11/2006 |
| JP | 2013-96388 | 5/2013 |

OTHER PUBLICATIONS

International Search Report dated Apr. 21, 2015 in corresponding International Application No. PCT/JP2015/052103.

*Primary Examiner* — John Bastianelli

(57) ABSTRACT

Fluid control valve including a valve body and an energizing member. The body is engaged with one end of a rotating shaft and moves along an axial direction of the shaft based on shaft rotation. The body opens and closes a first opening by the outer periphery, and one end comes into contact with and separates from a second opening. The member energizes the body on another end side of the shaft. A portion abutting on the second opening and a flow passage in which a fluid flows are at the one end of the body in the case where the first opening is fully closed. Since a valve-closed position of the body can be secured, and fluid flows in the flow passage, when a low flow rate is controlled, a stable flow rate is secured without closing the second opening which is a suction port in a valve-closed position.

6 Claims, 5 Drawing Sheets

(51) Int. Cl.
*F02M 23/00* (2006.01)
*F16K 3/24* (2006.01)

(58) Field of Classification Search
CPC ....... F02D 41/0002; F02D 9/08; F02M 69/32;
F02M 23/006; Y02T 10/42; Y02T 10/146
USPC ...... 251/129.11–129.13, 205, 229, 278, 284,
251/337, 120–122, 324–325
See application file for complete search history.

(56) References Cited

U.S. PATENT DOCUMENTS

| | | | |
|---|---|---|---|
| 6,375,086 B1 | 4/2002 | Babin et al. | |
| 6,561,480 B1 * | 5/2003 | Komiya | F16K 1/38 |
| | | | 251/122 |
| 6,935,616 B2 * | 8/2005 | Baumann | F16K 39/022 |
| | | | 137/614.18 |
| 7,900,888 B2 * | 3/2011 | Weldon | F16K 31/04 |
| | | | 251/129.11 |
| 2010/0038570 A1 * | 2/2010 | Nalini | F16K 31/04 |
| | | | 251/129.11 |

* cited by examiner

[Fig. 1]
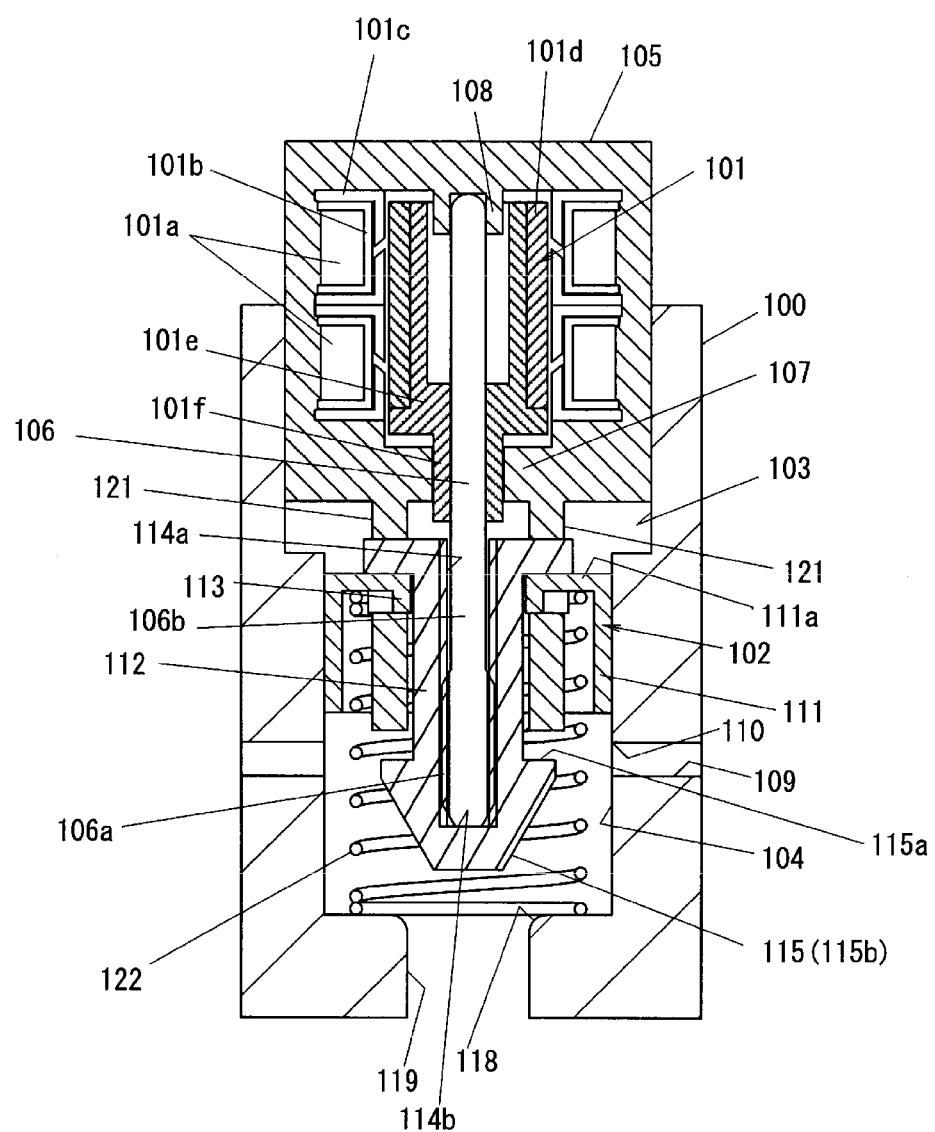

[Fig. 2]
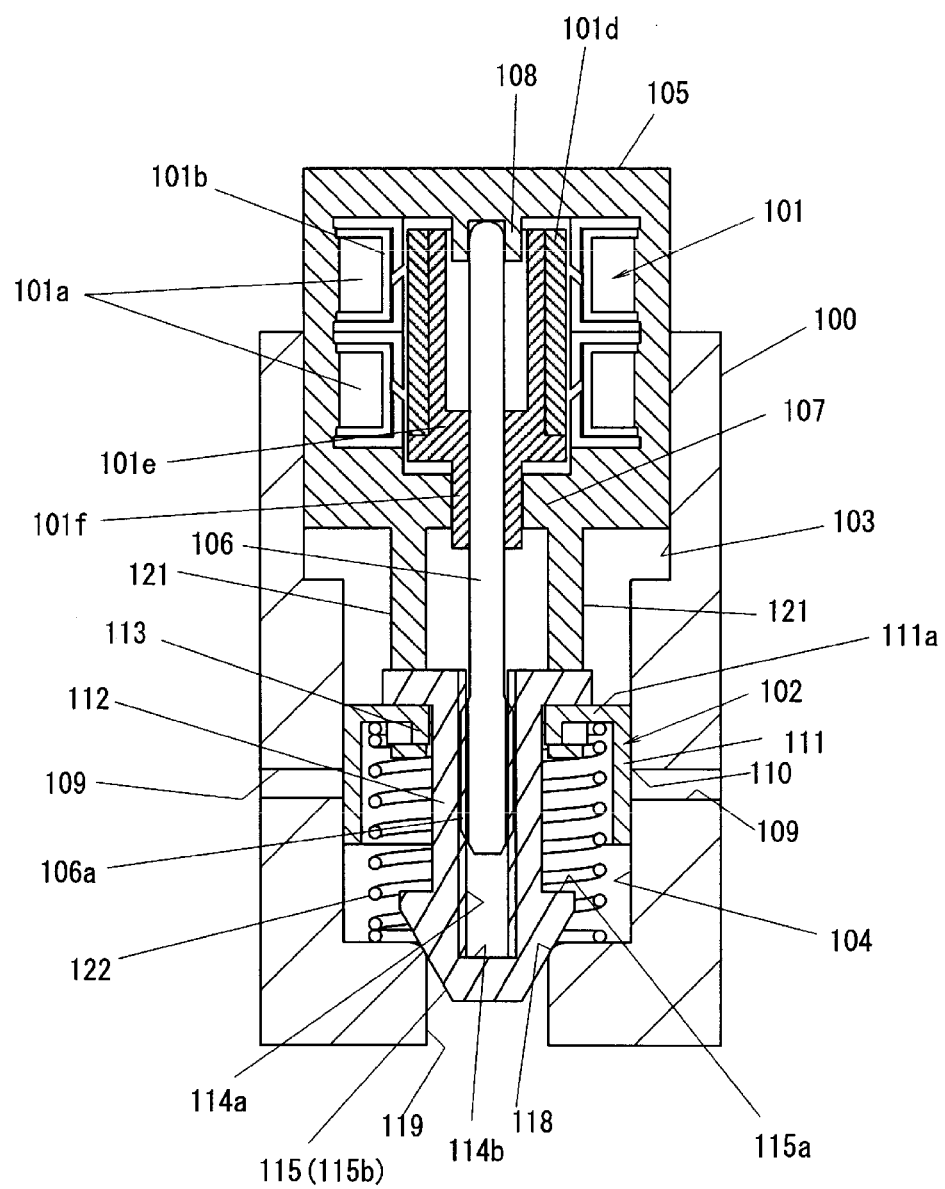

[Fig. 3]
(a)
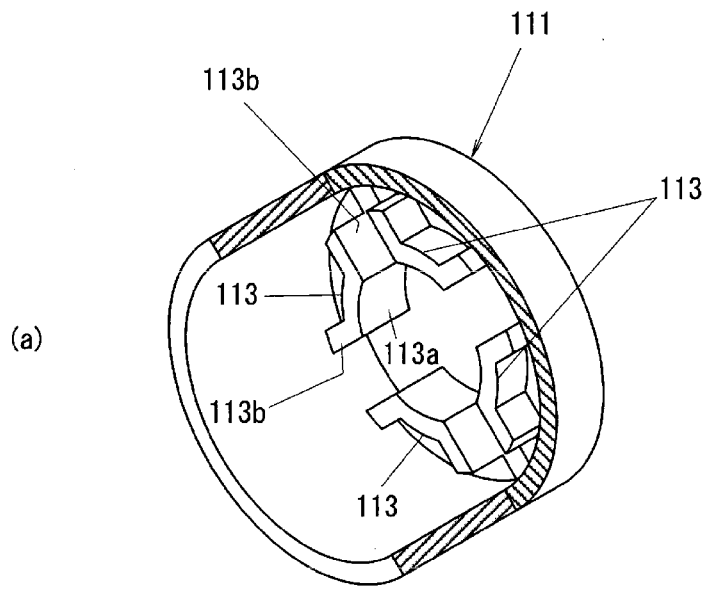
(b)
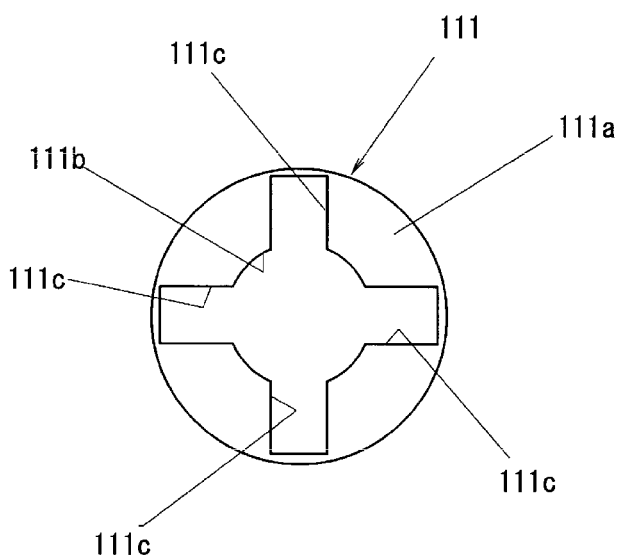

[Fig. 4]
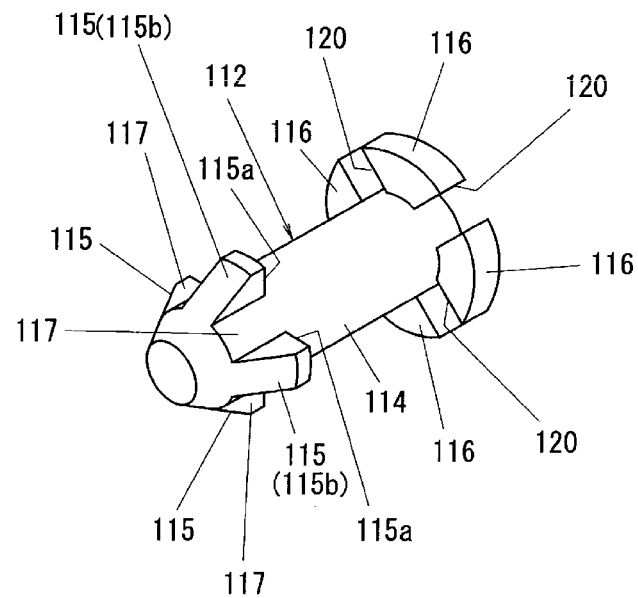
[Fig. 5]
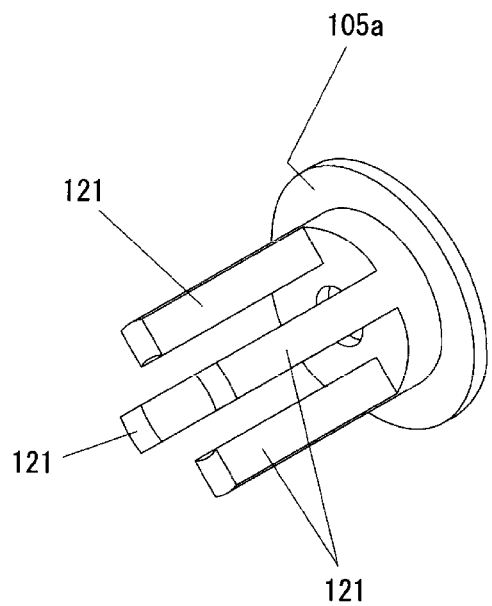

[Fig. 6]
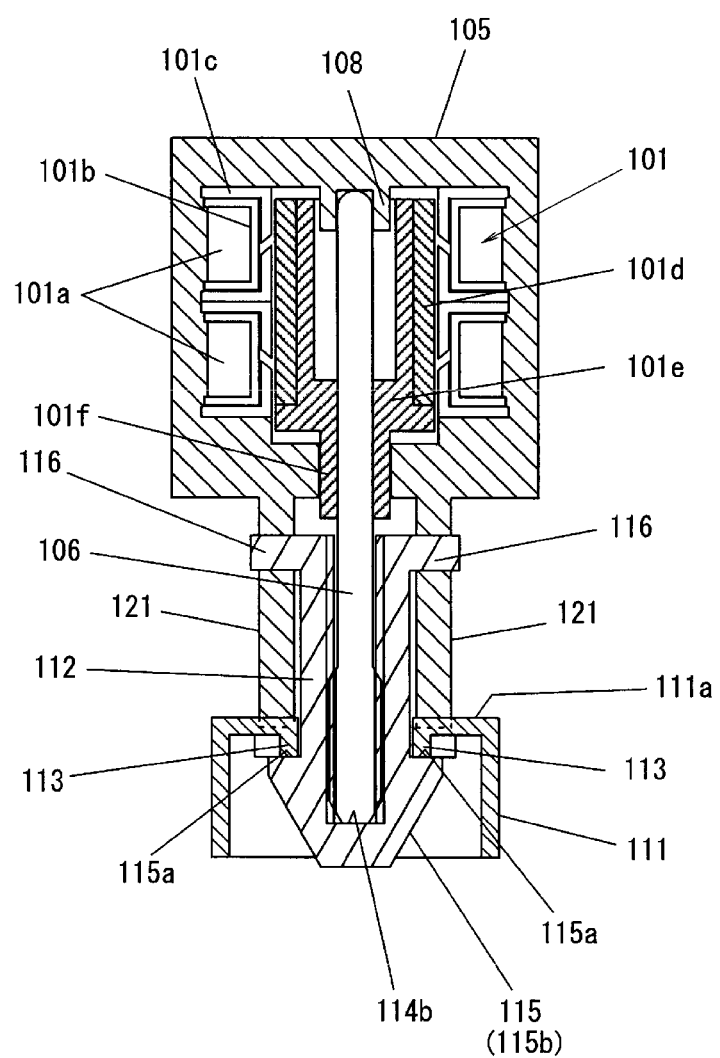

FLOW RATE CONTROL VALVE

CROSS-REFERENCE TO RELATED APPLICATIONS

This application is a U.S. National Stage Application, which claims the benefit under 35 U.S.C. § 371 of PCT International Patent Application No. PCT/JP2015/052103, filed Jan. 27, 2015 which claims the foreign priority benefit under 35 U.S.C. §119 of Japanese Patent Application No. 2014-011985, filed Jan. 27, 2014, the contents of which are incorporated herein by reference.

TECHNICAL FIELD

The present invention relates to a flow rate control valve which controls a flow rate of a fluid by operating by rotation of a driving source such as a motor.

BACKGROUND ART

Conventionally, in a vehicle such as an automobile and a motorcycle, for example, in the case of an engine in which fuel injection and ignition are controlled by an electronic controller, an idling speed control valve (ISCV) which is another electronically controlled air control valve is provided on a side of a throttle valve as an air control valve. The ISCV controls idle-up and stabilize idling when an air condition is operated. Specifically, for example, the ISCV controls an intake air amount to the engine and controls the engine to keep a target rotation speed during idling when a vehicle is in an idling state by tightening the throttle valve.

The ISCV, for example, includes a stepping motor, a rotating shaft of the stepping motor, and a valve body. The stepping motor works as an actuator which actuates a valve. The valve body includes a screw mechanism between the shaft and moves in an axial direction of the shaft. A top side of the shaft is set to a male screw, a nut provided to the valve is screwed to the male screw, and based on normal/reverse rotations of the shaft, a flow rate of intake air to an engine during idling is controlled when the valve body is moved to an axial direction of the shaft.

A flow rate control valve described in Patent Literature 1 is known as an example of the above-described flow rate control valve. The flow rate control valve is closed by closing both of a discharge port and a suction port by a valve body.

CITATION LIST

Patent Literature

Patent Literature 1: JP 2013-96388 A

SUMMARY OF INVENTION

Technical Problem

In the above-described conventional flow rate control valve, a suction port, in addition to a discharge port, is closed by a valve body in a valve-closed state. Therefore, the valve body is pulled toward the outside of the suction port since atmospheric pressure is changed at the suction port, a load is likely to be applied to the valve body, and also a stable flow rate may not easily secured when the discharge port is slightly closed to control a low flow rate.

However, if the valve body abuts on the suction port in a valve-closed state, a configuration is simplified, and an accurate position can be easily obtained.

The present invention is in view of the above circumstances, and an object of the present invention is to provide a fluid control valve capable of securing an accurate valve-closed position of a valve body and secure a stable flow rate when a low flow rate is controlled without closing a suction port in a valve-closed state.

Solution to Problem

To achieve the above-described object, a fluid control valve according to the present invention includes a body, a rotating shaft, a valve body, and an energizing member. The body includes a first opening through which a fluid passes and a second opening through which a fluid passes. The rotating shaft is rotatable in normal and reverse directions by a driving source. The valve body is engaged with one end of the rotating shaft. By moving along an axial direction of the rotating shaft based on rotation of the rotating shaft, the valve body opens and closes the first opening by an outer periphery, and one end of the valve body comes into contact with and separates from the second opening. The energizing member energizes the valve body on another end side of the rotating shaft. An abutting portion abutting on the second opening and a flow passage in which a fluid flows are provided at the one end of the valve body in the case where the first opening is fully closed by the outer periphery of the valve body.

In the present invention, in the case where the first opening, which is a discharge port, is closed, the rotating shaft rotates, and the valve body is moved in an axial direction of the rotating shaft. The first opening is closed by the outer periphery of the valve body, and an abutting portion provided to one end of the valve body abuts on the second opening which is a suction port. Consequently, an accurate valve-closed position of the valve body can be secured.

Further, even if the abutting portion of the valve body abuts on the second opening, a flow passage is provided to one end of the valve body, and a fluid flows in the flow passage. Therefore, when a low flow rate is controlled, a stable flow rate can be secured without closing the suction port in a valve-closed state.

In the above-described configuration of the present invention, a plurality of the abutting portions are provided in a circumferential direction of the valve body at predetermined intervals, and the flow passage is provided between the abutting portions adjacent to each other in a circumferential direction.

According to such a configuration, in a valve-closed state, abutting portions provided in a circumferential direction of a valve body at predetermined intervals abut on the second opening. Therefore, an accurate valve-closed position can be easily secured, and a fluid flows in a flow passage provided between abutting portions adjacent to each other in a circumferential direction. Consequently, when a low flow rate is controlled, a stable flow rate can be certainly secured without closing a suction port in the valve-closed state.

In the above-described configuration of the present invention, the abutting portion preferably includes an inclined surface which inclines on an axial side of the valve body as moving on one end side of the valve body and abuts on the second opening.

According to such a configuration, the inclined surface abutting on the second opening is provided to the abutting portion, and therefore, even if a diameter of the second opening is varied, the inclined surface certainly abuts on the second opening, and an accurate valve-closed position of the valve body can be certainly secured.

Further, since the inclined surface is formed to the abutting portion, the abutting portion can be inserted into the second opening. Therefore, a moving amount of the valve body can be increased without enlarging the valve body, and a control width of the valve body can be increased even if the valve body is downsized.

Further, in the above-described configuration of the present invention, an abutting portion abutting on one end of the rotating shaft is provided in the case where the valve body is moved on another end side in an axial direction of the rotating shaft, and the first opening is fully opened by the outer periphery of the valve body.

According to the above-described configuration, even if the first opening is fully opened by the outer periphery of the valve body, the abutting portion of the valve body abuts on one end of the rotating shaft. Therefore, an accurate valve-closed position of the valve body can be certainly secured.

Advantageous Effects of Invention

According to the present invention, a first opening is closed by an outer periphery of a valve body, and an abutting portion provided to one end of the valve body abuts on the second opening which is a suction port. Accordingly, an accurate valve-closed position of the valve body can be secured. Further, even if the abutting portion of the valve body abuts on the second opening, a flow passage is provided to one end of the valve body, and a fluid flows in the flow passage. Therefore, when a low flow rate is controlled, a stable flow rate can be secured without closing the suction port in a valve-closed state.

BRIEF DESCRIPTION OF DRAWINGS

FIG. 1 illustrates an example of a flow rate control valve according to the present invention and is a longitudinal sectional view of the flow rate control valve in a valve-open state.

FIG. 2 illustrates an example of the flow rate control valve according to the present invention and is a longitudinal sectional view of the flow rate control valve in a valve-closed state.

FIGS. 3(a) and 3(b) illustrate an example of the flow rate control valve according to the present invention, FIG. 3(a) is a perspective view of a valve member which is partially cut off, and FIG. 3(b) is a back view of the valve member.

FIG. 4 illustrates an example of the flow rate control valve according to the present invention and is a perspective view of a moving member.

FIG. 5 illustrates an example of the flow rate control valve according to the present invention and is a perspective view of a regulating member provided to a motor case.

FIG. 6 illustrates an example of the flow rate control valve according to the present invention and is a perspective view illustrating a motor and the moving member in which the valve member is attached.

DESCRIPTION OF EMBODIMENT

Hereinafter, an embodiment of the present invention will be described with reference to drawings. In the description below, descriptions regarding a vertical direction such as an upper end and a lower end are for simplifying an understanding in the drawings and are not for limiting such as a mounting attitude of a flow rate control valve.

FIGS. 1 and 2 are a sectional view illustrating an example of a flow rate control valve according to the present invention. As illustrated in FIGS. 1 and 2, the flow rate control valve includes a body 100, a motor as a driving source (stepping motor) 101, and a valve body 102.

The body 100 is formed in a cylindrical shape, and a cylindrical motor mounting portion 103 and a cylindrical valve body mounting portion 104 are consecutively provided in an axial direction in the body 100. The cylindrical motor mounting portion 103 mounts a motor 101. A diameter of the cylindrical valve body mounting portion 104 is smaller than a diameter of the motor mounting portion 103.

The motor 101 is provided in a motor case 105. The inside of the motor case 105 is formed in a cylindrical hollow columnar shape, and on an inner peripheral surface side of the motor case 105, annular two coils 101a along the inner peripheral surface are provided back and forth along an axial direction as a stator of the motor 101. The coil 101a is supported by a coil support member 101c in a state in which the coil 101a is wound around a coil bobbin 101b.

On an inner side of the annular coil 101a, a rotor 101e is provided in which a cylindrical magnet 101d is fixed on an outer periphery. The rotor 101e rotates around a stator, a stator and a rotor form a motor, and the rotor 101e including the magnet 101d is rotated by an electromagnetic force.

Further, the inside of the rotor 101e is formed in a cylindrical hollow columnar shape, and a projecting portion 101f is formed at one end (lower end) of the rotor 101e, and a through hole is formed at the projecting portion 101f. A rotating shaft 106 which is a rotating axis of a rotor is inserted through the through hole, and the rotating shaft 106 is fixed. Further, one end (lower end) of the rotor 101e is projected in a flange shape on an outer peripheral side, and one end side of the cylindrical magnet 101d is positioned. An outer peripheral surface of the flange-like portion and an outer peripheral surface of the magnet 101d have a substantially same size outer diameter and are coaxially arranged.

The rotating shaft 106 is a round rod member. If a tip of the projecting portion 101f of the rotor 101e is a substantial center, one end side (lower end side) is extended in the body 100 from the motor case 105. Further, another end side (upper end side) of the rotating shaft 106 is disposed on an inner side of the rotor 101e.

Furthermore, a male screw 106a is formed on an outer peripheral surface of one end side of the rotating shaft 106. Here, a portion other than the male screw 106a is a shaft 106b.

In the rotating shaft 106, a diameter of the male screw 106a is larger than a diameter of the shaft 106b, and the male screw 106a has a wider shape than other portions of the rotating shaft 106. A female screw 114a of the valve body 102 is screwed to the male screw 106a as described below.

Further, a center of the rotating shaft 106 is supported by a projecting portion 101f, and the projecting portion 101f is rotationally supported by a bearing 107 of the motor case 105. In FIG. 1, the bearing 107 is integrally illustrated with the motor case 105. However, the bearing 107 may be separated from the motor case 105.

Further, another end (upper end) of the rotating shaft 106 is disposed on an inner side of the rotor 101e as described above and rotationally supported by a shaft support portion 108. The shaft support portion 108 functions as a sliding bearing and also functions as a radial bearing and a thrust bearing. Specifically, the rotation center of the rotating shaft 106 is regulated by the shaft support portion 108, and also movement in a direction from one end to another end of the rotating shaft 106 along an axial direction of the rotating shaft 106 is regulated. Movement in an opposite direction is regulated by a compression coil spring 122 as an energizing member as described later.

The male screw 106a provided at one end of the rotating shaft 106 is screwed to the valve body 102, and the valve body 102 opens and closes a first opening 110, through which a fluid passes, by moving in an axial direction of the rotating shaft 106 based on rotation of the rotating shaft 106. The first opening 110 is formed by an opening disposed at an inner side end of a through hole 109 penetrating from an inner peripheral surface to an outer peripheral surface of the valve body mounting portion 104 of the body 100.

A plurality of the through holes 109 and the first openings 110 are provided in a circumferential direction of the body 100 at predetermined intervals. Further, the first openings 110 are opened and closed by the valve body 102.

The valve body 102 includes a valve member 111 and a moving member 112.

The valve member 111 is formed in a cylindrical shape as illustrated in FIG. 3(a), and an outer peripheral surface thereof is slidingly contacted to an inner peripheral surface of the valve body mounting portion 104 (refer to FIGS. 1 and 2). Therefore, the first opening 110 is opened and closed by an outer peripheral surface (outer periphery) of the valve member 111.

Further, one end of the valve member 111 is circularly opened, and a disk-shaped closing plate 111a is provided to another end. As illustrated in FIG. 3(b), the round-shaped through hole 111b is formed at the center of the closing plate 111a. Further, four rectangular through holes 111c radially disposed with respect to the through hole 111b are formed on the closing plate 111a. These four through holes 111c are disposed in a circumferential direction at equal intervals.

Further, as illustrated in FIG. 3(a), four ribs 113 are projected in a circumferential direction at equal intervals on aback surface of the closing plate 111a. The rib 113 includes a circular-arc peripheral wall portion 113a and linear wall portions 113b and 113b formed on both ends of the peripheral wall portion 113a. Inner peripheral surfaces of the four peripheral wall portions 113a of the four ribs 113 are consecutively formed with an inner peripheral surface of the round-shaped through hole 111b in an axial direction, and surfaces of the wall portions 113b and 113b facing in a circumferential direction are consecutively formed with surfaces of the rectangular through holes 111c facing in a circumferential direction, in an axial direction.

As illustrated in FIG. 4, the moving member 112 includes a cylindrical main body 114, an abutting portion 115 provided at one end of the main body 114, and a regulating portion 116 provided at another end of the main body 114.

As illustrated in FIGS. 1 and 2, the female screw 114a is formed on an inner peripheral surface of a cylindrical hole in the main body 114, and a male screw 106a, which is an end of the rotating shaft 106, is screwed to the female screw 114a. An end of the hole in which the female screw 114a is formed is closed and becomes an abutting surface (abutting portion) 114b, and one end surface of the rotating shaft 106 can abut on the abutting surface 114b.

Further, an outer diameter of the main body 114 is almost same as or slightly smaller than an inner diameter of the through hole 111b provided to the closing plate 111a of the valve member 111. Therefore, the main body 114 can be inserted into the valve member 111 through the through hole 11b.

In the case where the first opening 110 is fully closed by an outer periphery of the valve member 111, the abutting portion 115 abuts on a second opening 118 to be described later, and the valve body 102 in a valve-closed state is positioned. Further, the abutting portion 115 includes a locking portion 115a on which the rib 113 of the valve member 111 abuts and by which the valve member ill is prevented from coming off from the moving member 112.

As illustrated in FIG. 4, four abutting portions 115 are provided at one end of the main body 114 in a circumferential direction at equal intervals, and four flow passages 117 are provided at equal intervals in a circumferential direction between abutting portions 115 and 115 adjacent to each other in the circumferential direction. The abutting portion 115 is formed by cutting off a prefix conical portion provided at a tip of the main body 114 by a part of the flow passage 117, and the abutting surface (locking surface) 115a facing on the regulating portion 116 side of the abutting portion 115 can abut on the rib 113.

Further, the abutting portion 115 is formed in a size capable of passing through the rectangular through hole 111c formed on the closing plate 111a of the body 100, and the surface of the abutting portion 115, which faces on the regulating portion 116 side and is orthogonal to the main body 114, is the locking portion 115a (abutting surface). Therefore, when the main body 114 rotates at 45° around an axis after the abutting portion 115 has passed through the through hole 111c, the locking portion 115a of the abutting portion 115 can abut on the rib 113.

Further, an inclined surface 115b inclined with respect to an axis of the main body 114 of the abutting portion 115 is inclined so as to approach on an axial side of the main body 114 (valve body 102) as moving on one end side of the main body 114 (valve body 102).

Further, as illustrated in FIGS. 1 and 2, a through hole (suction hole) 119 is provided at a center of the closing plate provided at one end (lower end) of the body 100, and the first opening 118 is provided at an opening edge of an inner side end of the suction hole 119.

The inclined surface 115b of each of the four abutting portions 115 can abut on the first opening 118. Specifically, one end of the moving member 112 is inserted into the suction hole 119, and the inclined surface 115b abuts on the first opening 118. Consequently, further movement of the moving member 112 is regulated. Therefore, the inclined surface 115b is a stopper surface for regulating movement of the moving member 112, and accordingly the valve body 102 in a valve-closed state is positioned.

Further, in a state in which the inclined surface 115b abuts on the first opening 118, the flow passage 117 is provided between the first opening 118 and the main body 114, and a fluid (air) can flow through the flow passage 117.

The regulating portion 116 abuts on the valve member 111 and regulates movement of the valve member 111 to another end side of the rotating shaft 106. As illustrated in FIG. 4, four regulating portions 116 are provided in a circumferential direction at equal intervals by cutting off four portions of a disk-shaped flange portion, which is provided at another end of the main body 114, in a circumferential direction at equal intervals in a rectangular shape each, and a notch 120 is formed between the regulating portions 116 and 116 adjacent to each other in a circumferential direction.

The notch 120 is provided on an extension line in an axial direction of the flow passage 117, and a shape and a size of the notch 120 are substantially same as four rectangular through holes 111c provided on the closing plate 111a of the valve member 111.

The locking portion 115a of the abutting portion 115 can abut on the rib 113 by rotating the main body 114 around an axis at 45° after the abutting portion 115 has passed through the through hole 111c of the valve member 111. Further, the rectangular through hole 111c and the notch 120 are overlapped in an axial direction of the moving member 112, and the regulating portion 116 can abut on the closing plate 111a of the valve member 111 between the rectangular through holes 111c and 111c adjacent to each other in a circumferential direction. Therefore, movement of the rotating shaft 106 of the valve member 111 to another end side can be regulated by the regulating portion 116.

Further, as illustrated in FIGS. 1 and 2, in the body 100, a regulating member 121 is provided which is engaged with the valve body 102 and regulates rotation of the valve body 102 around an axis. Specifically, four columnar regulating members 121 are provided in a circumferential direction at equal intervals on a disk 105a fixed on another end surface of the motor case 105 as illustrated in FIG. 5. The regulating members 121 extend to the valve body mounting portion 104 in parallel with the rotating shaft 106 (refer to FIGS. 1 and 2) and disposed at equal intervals in a circumferential direction on an outer peripheral side of the projecting portion 101f in which the rotating shaft 106 is inserted.

Further, a sectional shape of the regulating member 121 almost same as or slightly smaller than the rectangular through hole 111c and 120, and in the case where the through hole 111c and the notch 120 are overlapped in an axial direction of the moving member 112, the regulating member 121 is inserted into the through hole 111c and the notch 120 and engaged with the valve member 111 and moving member 112, specifically engaged with the valve body 102. The regulating member 121 is fixed to the motor case 105 via the disk 105a and therefore can regulate rotation of the valve body 102 around an axis.

As illustrated in FIG. 6, a length of the regulating member 121 is set such that a lower end of the regulating portion 121 can be inserted into the four through holes 111c of the valve member 111 in the case where the moving member 112 moves upward, and a lower end surface of the rotating shaft 106 abuts on the abutting surface 114b in the moving member 112 (in the case where the moving member 112 is closest to the motor 101). Therefore, in such a state, rotation of the valve member 111 around an axis is regulated by the regulating member 112, and the rib 113 of the valve member 111 abuts on the locking portion 115a of the moving member 112. Consequently the valve member 111 is prevented from coming off from the moving member 112, specifically from the motor 101.

Further, as illustrated in FIGS. 1 and 2, the compression coil spring (energizing member) 122 is provided on one end side (lower end side) in the body 100, in other words, to the valve body mounting portion 104. One end (lower end) of the compression coil spring 122 is disposed around the suction port 118 on a bottom surface of the valve body mounting portion 104, and another end (lower end) thereof is inserted into the cylindrical valve member 111 and compressed on an outer side of the rib 113 on a back surface of the closing plate 111a of the valve member 111. Therefore, the valve member 111 is energized on another end side (lower end side) of the rotating shaft 106 by the compression coil spring 122.

As illustrated in FIG. 1, a state in which the valve body 102 is positioned on an upper side, and one end surface (lower end surface) of the rotating shaft 106 abuts on the abutting surface 114b on a lower end of a hole in which the female screw 114a of the moving member 112 is provided is a valve-open position in which the first opening 110 of the discharge hole 109 is opened. As illustrated in FIG. 2, a state in which the valve body 102 is positioned on a lower side, and the inclined surface 115b on one end (lower end) of the moving member 112 abuts on the second opening 118 of the suction hole 119 is a valve-closed position in which the second opening 118 is closed.

In the case where the valve body 102 is assembled to the motor 101, first the female screw 114a of the moving member 112 is screwed to the male screw 106a provided at one end (lower end) of the rotating shaft 106 of the motor 101. Accordingly, the moving member 112 is engaging with the rotating shaft 106, and four regulating members 121 are inserted into four notches 120 provided at another end of the moving member 112. Rotation of the moving member 112 is regulated by the regulating member 121.

In this case, by operating the motor 101 and rotating the rotating shaft 106 in a normal direction, a predetermined length of the male screw 106a of the rotating shaft 106 is screwed to the female screw 114a of the moving member 112.

Next, the moving member 112 is inserted into the valve member 111. Conversely, the valve member 111 is fitted outside of the moving member 112.

In this case, four through holes 111c of the valve member 111 are fitted to four abutting portions 115 of the moving member 112 in a circumferential direction, and the moving member 112 is inserted in to the valve member 111. Therefore, the abutting portions 115 pass through the through holes 111c, and the main body 114 passes through the through hole 111b.

Then, in the case where the abutting portions 115 pass through the through holes 111c and pass by the rib 113, the moving member 112 (main body 114) is rotated around an axis at 45°. Accordingly, the locking portion 115a of the abutting portion 115 faces the rib 113 of the valve member 111 and can abut on the rib 113, and the regulating member 121 matches to the through hole 111c of the valve member 111 in a circumferential direction.

Next, the regulating member 121 is inserted into the through hole 111c by further inserting the moving member 112 into the valve member 111 (fitting the valve member 111 to the outside of the moving member 112). Consequently, rotation of the valve member 111 is regulated.

In this state, by operating the motor 101 again and rotating the rotating shaft 106 in a normal direction, one end surface (lower end surface) of the rotating shaft 106 is abutted on the abutting surface 114b in the moving member 112 as illustrated in FIG. 6.

In such a state, rotation of the valve member 111 around an axis is regulated by the regulating member 112, and the rib 113 of the valve member 111 abuts on the locking portion 115a of the moving member 112 and is prevented from coming off from the moving member 112, specifically from the motor 101.

Next, the compression coil spring 122 is inserted into the valve body mounting portion 104 of the body 100 and disposed on a bottom surface of the valve body mounting portion 104.

Next, the valve body 102 including the moving member 112 and the valve member 111 prevented from coming off from the moving member 112 is mounted to the valve body mounting portion 104, and an upper end of the compression coil spring 122 abuts on the closing plate 111a of the valve member 111. In this state, the compression coil spring 122 is not compressed.

As the valve body 102 is mounted in the valve body mounting portion 104, the valve member 111 is moved by pushing to the upper side (another end side of the rotating shaft 106) by the compression coil spring 122. In this case, the compression coil spring 112 is slightly compressed by the own weight of the valve member 111.

When the valve member 111 moves upward by a predetermined distance, the valve member 111 abuts on the regulating portion 116 of the moving member 112, and further movement of the valve member 111 to the upper side (another end side of the rotating shaft 106) is regulated.

Further, as the valve member 111 moves upward, one end surface (lower end surface) of the regulating member 121 is positioned lower than one end surface (lower end surface) of the valve member 111.

The compression coil spring 122 is fully extended at a position where the valve member 111 is moved upward by a predetermined distance from the position where the discharge hole 110 formed to the body 100 is fully opened. Therefore, a predetermined amount of the compression coil spring 122 is compressed by moving down the valve body 102 with the motor case 105 by a predetermined distance from this state. In this case, the valve body 102 is moved downward such that the discharge hole 110 is not closed by the valve member 111.

After that, the valve body 102 is assembled to the motor 101 by fixing the motor case 105 to the motor mounting portion 103. In such a state, the valve body 102 is always energized upward by the compression coil spring 122. The rotating shaft 106 is screwed to the moving member 112 of the valve body 102. Therefore, the upward energizing force is applied to the rotating shaft 106 and further to the shaft support portion 108.

In such a flow rate control valve, the valve body 102 (valve member 111) opens the first opening 110 of the discharge hole 109 when the engine is in an idling state. Specifically, as illustrated in FIG. 2, in the case where the valve body 102 is at a valve-closed position, the rotating shaft 106 is rotated in a normal direction by the motor 101. By screw feeding actions of the male screw 106a of the rotating shaft 106 and the female screw 114a of the moving member 112, the moving member 112 starts moving upward in an axial line direction, and the valve member 111 starts moving upward with the moving member 112 (at the same timing with the moving member 112). Then, as illustrated in FIG. 1, an outer peripheral surface of the valve body 102 opens the first opening 110.

In this case, the moving member 112 moves upward until the abutting surface 114b of a hole, in which the female screw 114a is formed, abuts on one end surface (lower end surface) of the rotating shaft 106, and rotation of the rotating shaft 106 by the motor 101 is stopped when the abutting surface 114b abuts on the end surface. Then, one end (lower end) of the moving member 112 completely is separated from the first opening 118 of the suction hole 119, and the first opening 118 is fully opened.

Then, air introduced to the suction hole 119 through a piping from a surge tank on an upstream side from a throttle valve flow into the valve body mounting portion 104, is discharged from the discharge hole 110, and flows into an engine.

On the other hand, when the engine is not in an idling state, as illustrated in FIG. 1, the rotating shaft 106 is rotated in a reverse direction by the motor 101, and the valve body 102 (valve member 111) closes the first opening 110 of the discharge hole 109 in the case where the valve body 102 is at a valve-open position. Specifically, by a screw feeding action of the male screw 106a of the rotating shaft 106 and the female screw 114a of the moving member 112, the moving member 112 starts moving downward in an axial line direction, and the valve member 111 starts moving downward with the moving member 112 (at the same timing with the moving member 112). Then, as illustrated in FIG. 2, an outer peripheral surface of the valve member 111 closes the first opening 110.

In addition, in the valve body 102, further downward movement of the moving member 112 is regulated when the inclined surface 115b at one end (lower end) of the moving member 112 abuts on the first opening 118 of the suction hole 119 after or at the same time when the valve member 111 closes the discharge hole 110.

Further, in a state in which the inclined surface 115b abuts on the second opening 118, the flow passage 117 is provided between the second opening 118 and the main body 114, and a fluid (air) can flow through the flow passage 117.

According to the embodiment, in the case where the first opening 110, which is a discharge port, is closed, the rotating shaft 106 rotates, and the valve body 102 is moved in an axial direction of the rotating shaft 106. The first opening 110 is closed by the outer periphery of the valve member 111 of the valve body 102, and the abutting portion 115 provided at one end of the moving member 112 of the valve body 102 abuts on the second opening 118 which is a suction port. Accordingly, an accurate valve-closed position of the valve body 102 can be secured.

Further, even if the abutting portion 115 of the moving member 112 abuts on the second opening 118, the flow passage 117 is provided to one end of the moving member 112, and a fluid can flow through the flow passage 117. Therefore, the flow passage can be secured without closing the suction port (second opening) 118 in a valve-closed state.

Further, four abutting portions 115 are provided at predetermined intervals in a circumferential direction of the moving member 112 of the valve body 102, and the flow passage 117 is provided between the abutting portions 115 and 115 adjacent to each other in the circumferential direction. Therefore, an accurate valve-closed position of the valve body can be easily secured, and a fluid flows in the flow passage 17 provided between the abutting portions 115 and 115 adjacent to each other in the circumferential direction. Consequently, the flow passage can be certainly secured without closing the suction port (second opening) 118 in a valve-closed state.

Further, the inclined surface 115b abutting on the second opening 118 is formed to the abutting portion 115, and therefore, even if a diameter of the second opening 118 is varied, the inclined surface 115b certainly abuts on the second opening 118, and an accurate valve-closed position of the valve body 102 can be certainly secured.

In addition, since the inclined surface 115b is formed to the abutting portion 115, the abutting portion 115 can be inserted into the second opening 118. Therefore, a moving amount of the valve body 102 can be increased without enlarging the valve body, and a control width of the valve body 102 can be increased even if the valve body is downsized.

Further, the abutting surface (abutting portion) 114b which abuts on one end of the rotating shaft 106 is provided to a hole in the moving member 112 of the valve body 102 in the case where the valve body 102 is moved on another end side in an axial direction of the rotating shaft 106, and the first opening 110 is fully opened by the outer periphery of the valve member 111. Therefore, if the first opening 110 is fully opened by the outer periphery of the valve member 111, the abutting surface (abutting portion) 114b abuts on one end of the rotating shaft 106. Therefore, an accurate valve-closed position of the valve body 102 can be secured.

Further, in the case where the valve body 102 is assembled to the motor 101, the female screw 114a of the moving member 112 is screwed to the male screw 106a on one end of the rotating shaft 106 rotatable by the motor 101. Then, the moving member 112 is inserted in the valve member 111, the valve member 111 is abutted on the locking portion 115a, and the valve member 111 is prevented from coming off from the moving member 112. On the other hand, the compression coil spring 122 is provided to the valve body mounting portion 104 in the body 100, and the compression coil spring 122 is stably held in the body 100. Then, the valve member 111 is arranged to the compression coil spring 122, and consequently the valve body 102 can be easily assembled to the motor 101.

Further, when the valve body 102 is removed, the valve member 111 prevented from coming off from the moving member 112 is pulled out from the body 100 with the moving member 112 and separated from the compression coil spring 122, and then the moving member 112 is moved downward by rotating the rotating shaft 106 by the motor 101. Accordingly, rotation regulation of the valve member 111 by the regulating member 121 is released. Then, by rotating the valve member 111 around an axis at 45°, locking of the valve member 111 is released, and the valve member 111 is removed from the moving member 112, and also the valve body 102 is easily removed by removing the moving member 121 from the rotating shaft 106.

Further, the moving member 112 can be inserted into the valve member 111, and by inserting the moving member 112 into the valve member 111 and relatively rotating them around an axis at a predetermined angle (45°), the valve member 111 can abut on the locking portion 115a, and the valve member 111 is certainly prevented from coming off from the motor 101 when the valve body 102 is assembled to the motor 101.

Furthermore, in the body 100, the regulating member 121 which is engaged with the valve body 102 and regulates rotation of the valve body 102 around an axis is fixed to the motor case 105. Therefore, in the case where the rotating shaft 106 rotates in normal and reverse directions by the motor 101, the regulating member 121 regulates rotation around an axis of the valve body 102 by being engaged with the valve body 102, and consequently the valve body 102 can be certainly moved along an axial direction of the rotating shaft 106.

Further, in the case where the valve member 111 can abut on the locking portion 115a and is prevented from coming-off from the moving member 112, the regulating member 121 regulates rotation of the valve member 111 around an axis, and the valve member 111 is certainly prevented from coming off from the moving member 112.

REFERENCE SIGNS LIST 100 body
101 motor
102 valve body
106 rotating shaft
106a male screw
110 first opening
114a female screw
114b abutting surface (abutting portion)
115 abutting portion
117 flow passage
118 second opening
122 compression coil spring (energizing member)

The invention claimed is:

1. A flow rate control valve, comprising:
a body including a first opening through which a fluid passes and a second opening through which a fluid passes;
a rotating shaft rotatable in normal and reverse directions by a driving source;
a valve body engaged with one end of the rotating shaft, the valve body which opens and closes the first opening by an outer periphery and of which one end comes into contact with and separates from the second opening, by moving along an axial direction of the rotating shaft based on rotation of the rotating shaft; and
an energizing member configured to energize the valve body on another end side of the rotating shaft,
wherein an abutting portion abutting on the second opening and a flow passage in which a fluid flows are provided to the one end of the valve body in a case where the first opening is fully closed by the outer periphery of the valve.

2. The flow rate control valve according to claim 1, wherein a plurality of the abutting portions are provided in a circumferential direction of the valve body at predetermined intervals, and the flow passage is provided between adjacent abutting portions in the circumferential direction.

3. The flow rate control valve according to claim 2, wherein the abutting portion includes an inclined surface which inclines on an axial side of the valve body as moving on one end side of the valve body and abuts on the second opening.

4. The flow rate control valve according to claim 1, wherein an abutting portion which abuts on one end of the rotating shaft is provided in a case where the valve body moves on another end side in an axial direction of the rotating shaft, and the first opening is fully opened by the outer periphery of the valve body.

5. The flow rate control valve according to claim 2, wherein an abutting portion which abuts on one end of the rotating shaft is provided in a case where the valve body moves on another end side in an axial direction of the rotating shaft, and the first opening is fully opened by the outer periphery of the valve body.

6. The flow rate control valve according to claim 3, wherein an abutting portion which abuts on one end of the rotating shaft is provided in a case where the valve body moves on another end side in an axial direction of the rotating shaft, and the first opening is fully opened by the outer periphery of the valve body.

* * * * *